(12) United States Patent
Chow et al.

(10) Patent No.: US 6,619,587 B1
(45) Date of Patent: Sep. 16, 2003

(54) AIRCRAFT NOISE REDUCTION APPARATUS

(75) Inventors: Leung C Chow, Bristol (GB); David A Foot, Bristol (GB); Christopher N Wood, Nr Congleton (GB)

(73) Assignee: Airbus UK Limited, Bristol (GB)

( * ) Notice: Subject to any disclaimer, the term of this patent is extended or adjusted under 35 U.S.C. 154(b) by 0 days.

(21) Appl. No.: 09/655,347

(22) Filed: Sep. 5, 2000

Related U.S. Application Data

(63) Continuation of application No. PCT/GB00/02525, filed on Jun. 29, 2000.

(30) Foreign Application Priority Data

Jul. 8, 1999 (GB) .............................................. 9915977

(51) Int. Cl.⁷ .............................................. B64C 25/16
(52) U.S. Cl. .................................. 244/100 R; 244/1 N
(58) Field of Search ........................ 244/104 R, 100 R, 244/102 R, 103 R, 102 A, 102 SL, 102 AS, 104 CS, 104 FP, 1 N; 180/904

(56) References Cited

U.S. PATENT DOCUMENTS

| 1,446,531 | A | * | 2/1923 | Williams |
| 2,129,824 | A | * | 9/1938 | De Seversky |
| 2,180,462 | A | | 11/1939 | De Seversky |
| 2,363,126 | A | * | 11/1944 | Gibson |
| 2,652,214 | A | * | 9/1953 | Cussons |
| 5,058,827 | A | * | 10/1991 | Dansereau et al. |
| 5,104,063 | A | * | 4/1992 | Hartley |
| 5,269,481 | A | * | 12/1993 | Derrien |
| 5,478,030 | A | * | 12/1995 | Derrien et al. |

FOREIGN PATENT DOCUMENTS

| EP | 0 846 540 A2 | 6/1998 |
| GB | 494542 | 10/1938 |
| GB | 534522 | 3/1941 |
| GB | 745965 | 3/1956 |

* cited by examiner

Primary Examiner—Tien Dinh
(74) Attorney, Agent, or Firm—Nixon & Vanderhye P.C.

(57) ABSTRACT

An aircraft, aircraft landing gear and apparatus including at least one attachment (15,17,76,93,94,111) for noise reduction purposes are provided. Such attachments are shaped and positioned on the landing gear to deflect air away from noise-inducing components (64,65) of the landing gear and to permit deflection and articulation movement and also stowage of the landing gear whilst the attachments are installed thereon. The attachments are not designed to be drag-reducing.

11 Claims, 7 Drawing Sheets

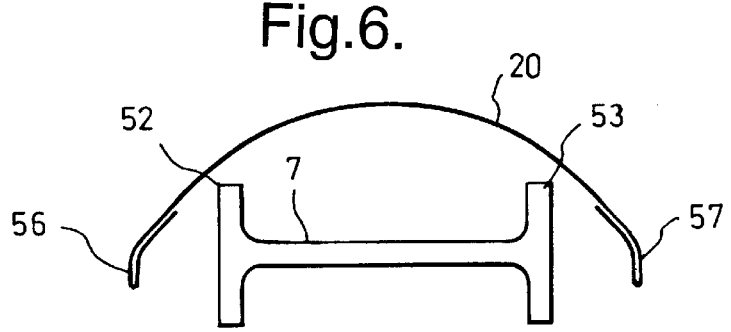
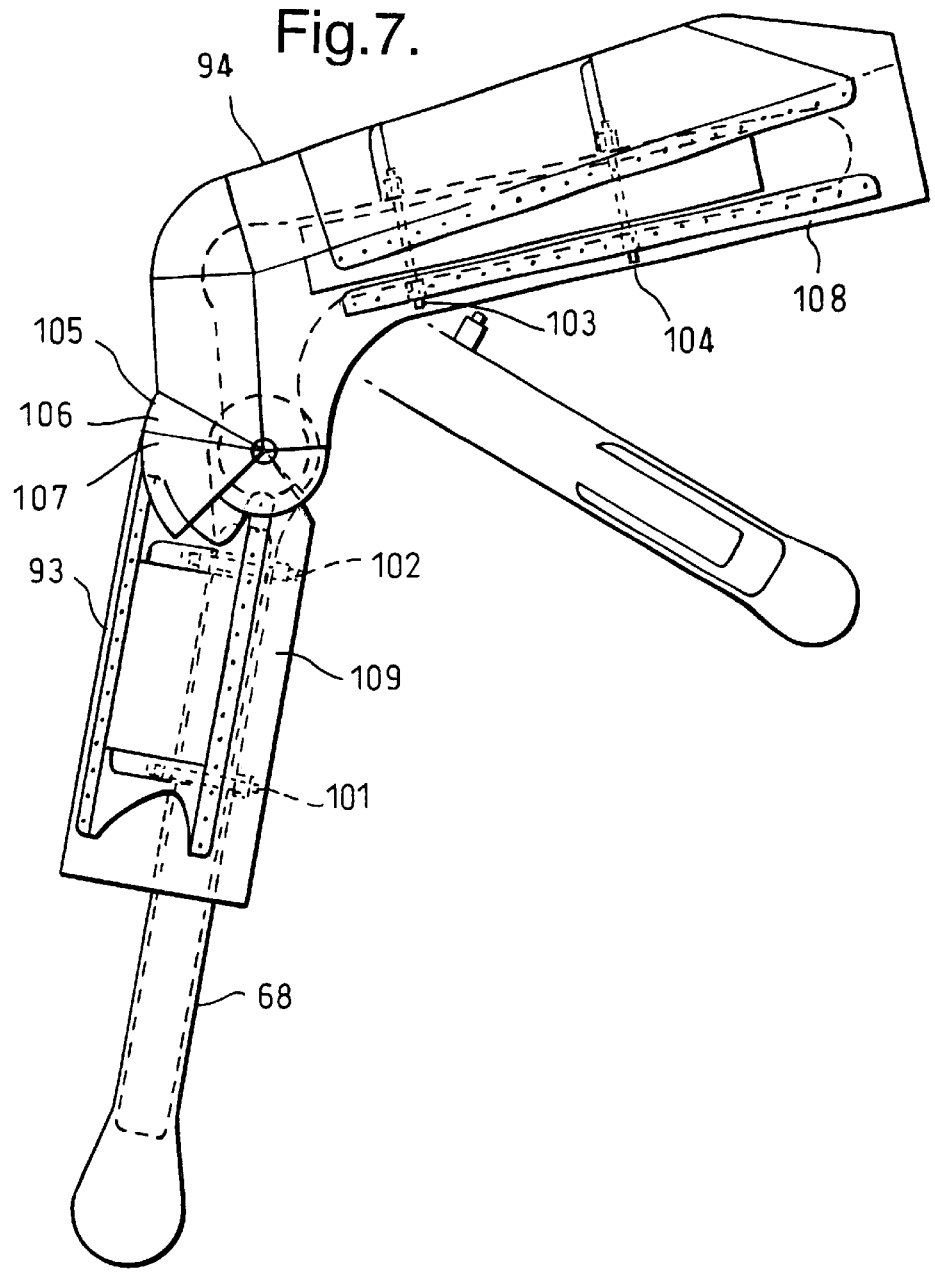

AIRCRAFT NOISE REDUCTION APPARATUS

This is a Continuation of PCT International Application No. PCT/GB00/02525, filed Jun. 29, 2000, the entire content of which is hereby incorporated by reference in this application.

BACKGROUND OF THE INVENTION

1. Field of the Invention

The invention relates to aircraft noise reduction apparatus, in particular to apparatus to reduce noise emanating from landing gear of the aircraft when deployed on approach to landing.

2. Discussion of Prior Art

The invention has particular application to commercial aircraft when landing at airports in or near to built up areas where aircraft approach noise is an increasing nuisance with increasing frequency of use of airports and ever larger aircraft. Noise emanating from commercial aircraft, whether cargo aircraft and/or passenger carrying aircraft, is now an important environmental issue. The increasing frequency of use of airports has led to aircraft of increasing size being used. This in turn has led to greater noise being generated by each aircraft in its approaches to the airport. Modem high bypass ratio turbofan engines are now extremely quiet on approach to landing and dominant noise on some aircraft types, perceived at ground level, is starting to become the noise generated by landing gear and by high lift devices on the wings.

This invention addresses the problem of aircraft noise, as perceived at ground level, generated by landing gear. Although noise is likely to be induced by any element which creates turbulence in the airflow past the landing gear, those elements which have been found particularly likely to create high noise levels are as follows: elements which act as Helmholz resonators such as hollow axles, apertures, fastener fittings, spindles, etc; also elements likely to create small vortices such as small protuberances, sharp edges; dresssings such as small pipes, tubes, cables, and coil springs, etc. All such features are to be found aplenty on modern landing gear and tend to be more prevalent in the region of steering gear and wheel axles.

Although wind tunnel tests have been carried out on landing gear fully enclosed by fairings to determine noise levels in the far field, such full enclosure fairings are normally completely impractical for everyday use on an aircraft. This is because articulation of the landing gear during deployment and retraction movement is prevented by the fairings and because very limited stowage space in the landing gear bay in most aircraft will not accommodate full enclosures owing to the space which they take up. Additionally, full enclosure fairings render daily visual inspection regimes and maintenance of the landing gear almost impossible. Firstly, this is because visible inspection through such fairings is generally impossible and secondly because regular removal of such fairings for inspection or maintenance is far too time consuming and difficult. To date therefore no practical solution to the problem of landing gear induced airframe noise has been found.

SUMMARY OF THE INVENTION

According to a first aspect of the invention there is provided aircraft noise reduction apparatus including at least one noise-reducing attachment for landing gear of the aircraft shaped for positioning on the landing gear to deflect air away from noise inducing components of the landing gear and to permit deflection, articulation movement and stowage of the landing gear with the attachment installed.

The attachments may comprise deflector screens adapted not to completely surround noise inducing components on the landing gear. The said lack of a complete surrounding being for the purposes of allowing the said access and foldability of the landing gear.

Induced noise is proportional to the sixth power of the relative velocity of the airflow and component around which the air flows, and attachments of the invention are positionable to deflect incident air away from noise inducing components, preferably into the free stream.

The attachments must withstand all aerodynamic loads and foreign object damage, and it will be appreciated that the use of attachments according to the invention may increase landing gear drag.

Preferably a said attachment is shaped such that when positioned on the landing gear, airflow over the attachment during flight leaves the attachment substantially in the free stream direction.

Preferably a said attachment is shaped to avoid or minimise an air stagnation region forming in front thereof when positioned on the landing gear and in use. Such stagnation regions tend to increase both drag and noise emanating downstream of the stagnation region. The term "in front of" as used herein refers to a position upstream in the airflow, during flight.

In regions of the landing gear where incident air is accelerated between components of the landing gear, such as struts, stays and actuators, at least one said attachment is preferably positioned to deflect incident air away from the said air-accelerating region. In this way any noise-inducing components of the landing gear positioned in the said air-accelerating region will not be subject to the passage of such accelerated high speed air past them.

The apparatus may include an axle attachment positionable in front of an axle for nose gear of the aircraft to deflect air away from noise inducing components such as landing gear dressings in the region of the axle.

The axle attachment may be shaped to shield items such as a towbar fitting on the nose gear and the said shaped portion is desirably separately removable or pivotable out of the way in order to provide access to such a towbar fitting without disturbing the remainder of the axle attachment. Cam fasteners or other quick release fittings are suitable for fastening the shaped portion.

The axle attachment may extend laterally into close proximity with the wheels and may include generally cylindrical wheel extensions extending between a central portion thereof and each wheel whereby to deflect air away from noise emanating components on the axle and at the same time to deflect air away from a cavity formed within each wheel.

The wheel extensions preferably extend into close proximity with a rim of each wheel. Alternatively the wheels may be fitted with inner hub caps or wheel fillers. Such fillers may be of say foam material formed in two opposing sections with wedge-shaped elements driven into position therebetween. The foam or like material is preferably covered on the outside with a weatherproof material.

The axle attachment may include upper extension portions for positioning on either side of a main leg of the nose gear to deflect air away from torque link attachments usually sited on the axle.

The apparatus may include a said attachment positionable in front of a steering mechanism for the landing gear. Such a steering mechanism has been found to be prone to noise inducement including, as it usually does, many sharp edges, apertures and sundry pipe and cable work.

Similarly, the axle attachment deflects air away from another region of the landing gear particularly prone to noise inducement, i.e. the joint between the main leg and the axle, again liable to include sundry sharp edged fittings and pipe and cable work.

For circular landing gear components such as main legs or actuators positioned immediately in front of noise inducing components, transition strips of tape may be attached to the circular component on either side thereof to encourage clean detachment of airflow therefrom and to encourage airflow away from a region immediately behind the circular component.

Where articulation and stowage permits it, components such as circular legs or actuators may be fitted with trailing extensions from either side thereof. Such extensions, in combination with the component, may then act as an attachment according to the invention to deflect air away from noise inducing components behind the said component with trailing extensions.

The said apparatus may include at least one said attachment positionable in front of an apertured landing gear strut or stay to deflect air away from edges of the aperture.

For a said strut or stay having surfaces extending approximately streamwise in the airflow a said attachment may be shaped to blend in airflow leaving the attachment with airflow passing over the said streamwise extending surfaces. Alternatively, where further noise inducing elements are positioned on the landing gear to the rear of the said attachment, the attachment may be flared or otherwise shaped also to deflect air away from the said rearward noise inducing elements. In this regard it has been determined that for an attachment to accelerate incident air is not unacceptable so long as the accelerated air does not pass over noise-inducing components.

A said attachment whilst being shaped to avoid any regions of air stagnation where possible may also be shaped or flattened as appropriate to avoid other elements of the landing gear or further attachments, during movement such as articulation and/or stowage of the landing gear.

Where the landing gear includes a wheeled bogie having a bogie beam the apparatus may include an attachment in the form of an undertray extending in front of and underneath the bogie beam to deflect air away from noise inducing elements in the region of the bogie beam, for example brake rods, bearings and their mountings, other fittings and sundry pipe and cable work.

An advantage of the undertray not extending above and behind the bogie beam is that inspection and maintenance access and air cooling are not thereby prevented by the attachment.

Where the bogie beam is tilted upwardly at the front, during approach, the area of the bogie beam left exposed is downstream of the undertray and thus the passage of high speed air past noise inducing components associated with the bogie beam is prevented by the undertray attachment.

Preferably the undertray includes at least one door therein to provide access to concealed items such as jacking points for the bogie.

The undertray may have a single curvature aerodynamic surface and may be of a width to permit air to pass between the undertray and wheels on the bogie to cool brakes. Preferably the undertray includes a forward upwardly extending aerodynamic surface blended smoothly into an under surface extending underneath and along the bogie beam, desirably with a further surface extending longitudinally of the bogie beam on either side of the undertray depending from lateral edges of the undertray, preferably orthogonal to the said aerodynamic surface. In this way air spilling over each lateral edge of the undertray in the region of wheel brakes will be able freely to flow past the brakes but will not be accelerated past the brakes by any funneling effect of the surface contours of the undertray.

Where the bogie includes a pair of forward articulation links a said attachment may comprise a pair of articulating fairings, one mounted to each articulation link with an aerodynamically contoured interface being defined between the fairings. Preferably the said interface comprises a generally spherical element on one fairing co-operating with generally circular section tubing of the other. The spherical element desirably has its centre coincident with a pivot axis between the articulating links.

Where the landing gear includes a door attached thereto extending in a generally streamwise direction to one side of a main leg of the landing gear a said attachment may comprise a deflector fairing extending from the door in front of at least the main leg of the landing gear. Preferably the fairing is positionable in sealing engagement with the door and may additionally extend in front of any further struts, stays and/or actuators for the landing gear located in the vicinity of the main leg thereby to deflect air away from all said landing gear components. For a main landing gear having a drag stay extending upwardly in the vicinity of the main leg and a retraction actuator similarly extending upwardly in the vicinity of the main leg, the said fairing not only achieves deflection of the air away from any noise inducing fittings on the main leg, but also deflects air away from passages formed between any combination of the main leg, the actuator, the drag stay and the main leg door where air would otherwise be accelerated therethrough usually past sundry noise inducing fittings.

For a large aircraft the undertray may be in excess of 2 metres in length and is desirably constructed to possess adequate longitudinal and torsional stiffness to enable handling when off the aircraft.

The front portion of the undertray desirably has extension portions to extend around the lower articulation link fairing and thus provide a smooth airflow in this area, upon approach to landing. Generally a main landing gear with a bogie will approach landing with the rear wheels deflected downwardly and the front wheels deflected upwardly. The undertray and lower articulation link fairing thus desirably lie closely adjacent one another when the bogie is in approach configuration.

The undertray may be attachable to axles on the bogie, and/or to the bogie beam itself by means of band-type clamps adapted to pass around the axle/bogie beam and through at least one part-annular chamber formed in an extension piece fixed to the undertray.

In general, all attachments will be as easily removable as possible, employing either existing screw-type fasteners on the gear and/or clamps around items of the gear such as struts, stays and axles. Some attachments will inevitably need to be removed for maintenance, at some stage, and here ease of removal and re-fitting is essential. All attachments are also preferably retro-fittable to existing designs of landing gear.

According to a second aspect of the invention there is provided aircraft landing gear including apparatus according to the first aspect of the invention.

According to a third aspect of the invention there is provided an aircraft incorporating landing gear fitted with noise-reduction apparatus according to the first aspect of the invention.

BRIEF DESCRIPTION OF THE DRAWINGS

The invention will now be described by way of example with reference to the accompanying drawings of which:

FIG. 6 is a section through a nose landing gear lower drag stay with fairing attachment, FIG. 7 is a side view of a landing gear articulation link with fairing.

DETAILED DISCUSSION OF EMBODIMENTS

Figure 1:
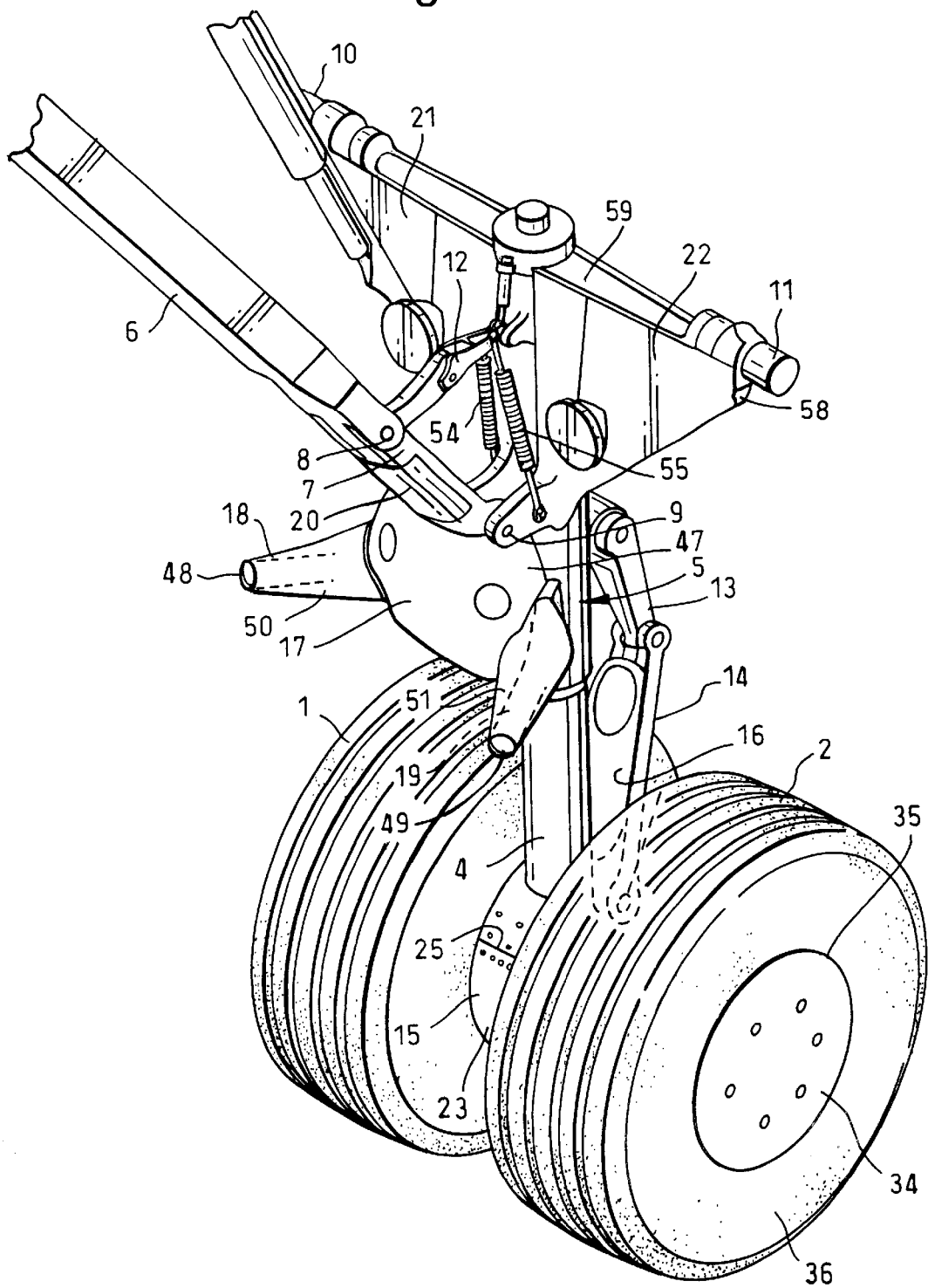
FIG. 1 is an orthogonal view of nose landing gear fitted with apparatus according to the invention.
Figure 3:
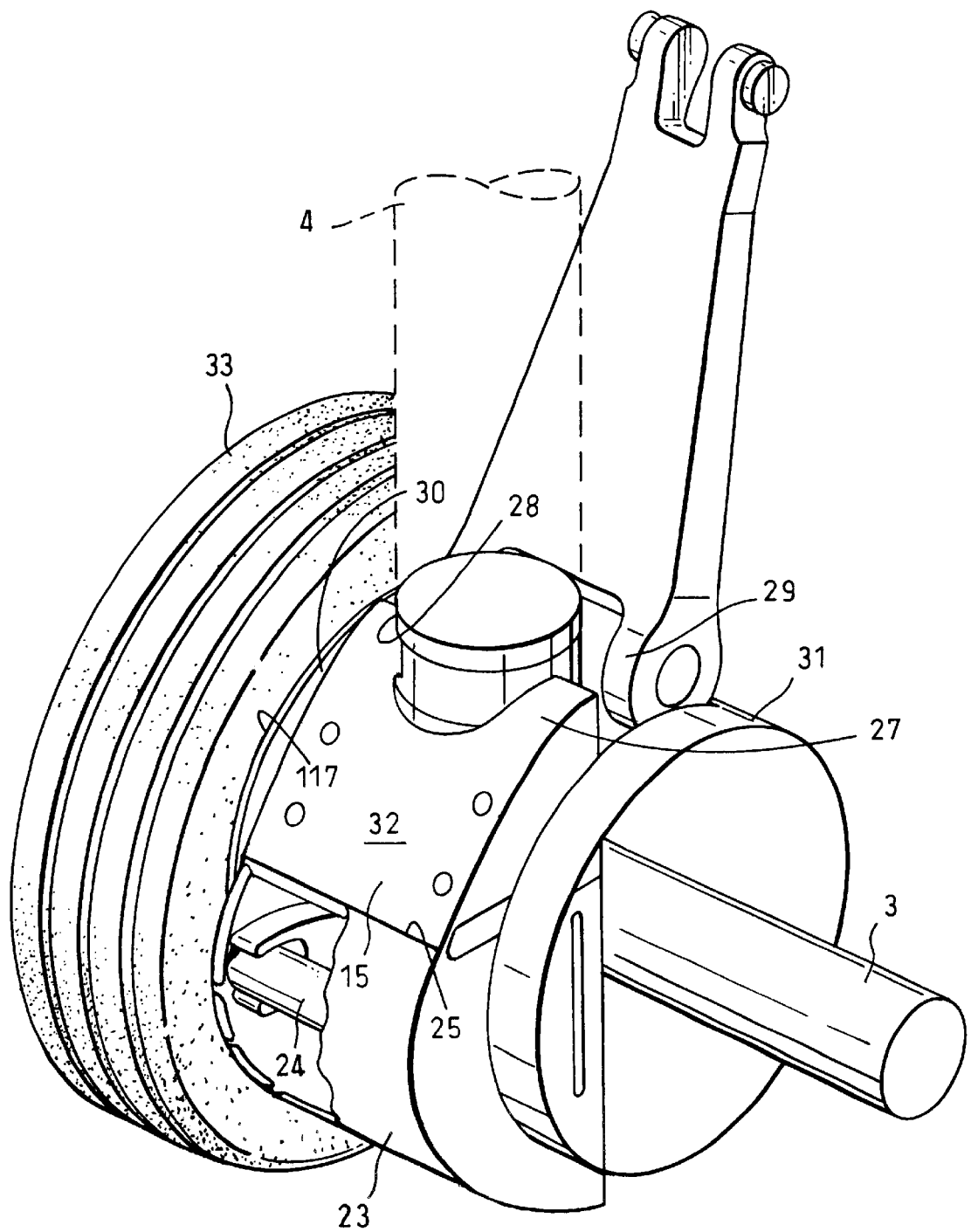
FIG. 3 is an orthogonal view of part of a nose landing gear fitted with an attachment according to the invention.

Referring to FIGS. 1 and 3, an aircraft nose landing gear is shown having wheels 1, 2, an axle 3 (see FIG. 3), a main telescopic leg 4, and steering mechanism shown generally at 5, an upper drag stay 6 pivotally connected to a lower drag stay 7 at pivot 8 and to the leg 4 at pivot 9, pintle bearings 10, 11, a drag stay release mechanism 12 and torque links 13, 14. The nose gear is fitted with various noise-reducing attachments as follows. All have been designed to provide the most streamlined shape commensurate with maximum total noise reduction and providing room for articulation of the landing gear during use, during retraction/deployment and during stowage. Drag may actually be increased owing to the fitting of the attachments. Shown in FIGS. 1 and 3 is an axle fairing attachment 15; a lower torque link attachment 16 (shown in FIG. 1 only); a steering mechanism attachment 17; steering actuator covers 18, 19; a lower drag stay attachment 20 and main fitting attachments 21, 22.

Referring to FIG. 3, the axle fairing attachment 15 is clamped around the leg 4 by a clamp (not shown). A lower hinged portion 23 covers a towbar fitting 24 and may be hinged about the axis 25 for access to the towbar fitting. An upper portion 26 of the axle attachment 15 has extension portions 27, 28 positioned to deflect incident air away from lower pivots 29 of the lower articulation link 14. Cylindrical extensions 30, 31 extend between a central portion 32 of the attachment and wheels 33. The cylindrical extensions 30, 31 extend in close proximity with rims 117 of the wheels to prevent noise being generated by the passage of incident air across Helmholz resonators formed by the wheels.

External wheel cover attachments 34 extend into close proximity with rims 35 of each wheel whilst not overlapping the tyre 36, so that inspection of the tyres is not interfered with. Such wheel covers may be annular in shape to fit around central forced-air-cooling ducts for the wheels and may be mounted thereon.

Figure 4:
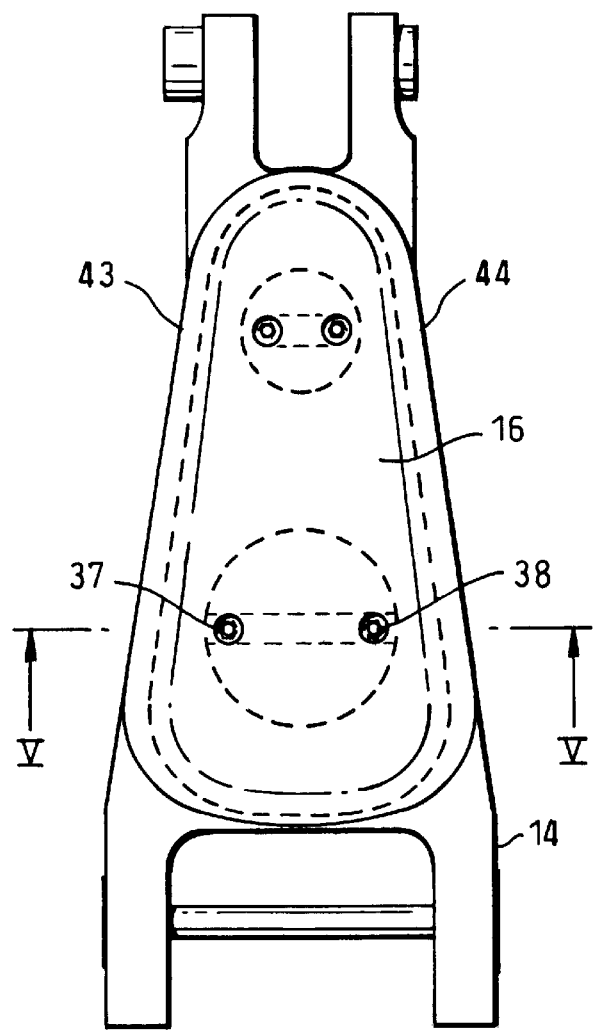
FIG. 4 is a top plan view of a torque link with fairing attachment.
Figure 5:
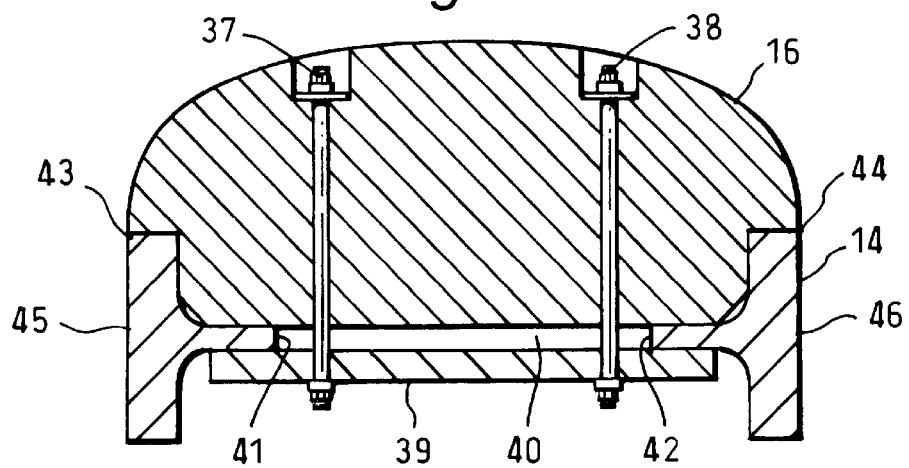
FIG. 5 is a section along the line V—V of FIG. 4.

In FIG. 1 the lower torque link attachment 16 is generally domed but with a scallop to provide clearance when the links 13 and 14 move together during compression of the main leg 4. Referring to FIGS. 4 and 5 such an attachment as that shown at 16 is shown bolted into position using bolts 37, 38 passing through the attachment 16 for fastening behind a backing plate 39 placed behind an aperture 40 in the torque link 14. Edges 41, 42 defining the aperture 40 are therefore covered by the attachment 16, just as are edges 43, 44. It will be noted that streamwise extending surfaces 45, 46 are blended in with the attachment 16 such that air leaving the attachment at positions 43, 44 blends with free stream air passing over surfaces 45, 46.

The steering mechanism attachment 17 is a generally domed shape formed to minimise any stagnation areas centrally thereof. Edge region 47 is shaped and positioned to merge air leaving the attachment with free stream air, tangential thereto. The region of the landing gear behind the attachment 17 is prone to noise generation and this attachment is effective for reducing noise emanating from the landing gear.

Steering actuator covers 18, 19 have domed ends 48, 49 and smoothly curving portions 50, 51 covering actuator tubes (not shown) and sundry pipework (not shown).

Referring to FIGS. 1 and 6, the lower drag stay 7 has a fairing attachment 20 positioned in front thereof. The attachment 20 is not designed to fit closely with the drag stay 7 but is made deliberately wider to deflect air not only past edges 52, 53 but also away from coil springs 54, 55 of the drag stay release mechanism 12. It will be noted that edge regions 56, 57 of the attachment 20 are shaped to blend in air leaving the attachment with free stream air. The coil springs 54, 55 may be fitted with socks, preferably transparent for inspection purposes, to reduce induced noise.

Lastly, main fitting attachments 21, 22 cover apertures defined between the main leg 4, diagonal bracing member 58 and a pintle member 59. The main fitting attachments are relatively planar on their front surface to allow space for articulation of the nose gear during retraction and stowage.

It will be seen that the fitting of relatively brief fairing attachments to the nose gear has had the effect of covering many quite troublesome areas of noise generation but that these attachments may be easily removed for access and are in all cases designed to allow for compression of the main leg and articulating movement of the nose gear and stowage thereof in its stowage bay (not shown). It will be noted that in all cases the attachments are designed to be retro-fittable to an existing landing gear, clamping having been used throughout as a method of attachment. Additionally, the relatively small size of the attachments has kept additional weight to a minimum.

The skilled reader will note that the upper drag stay 6 has no fairing attachment thereon. This part of the drag stay is largely contained within the fuselage of the aircraft.

Upper torque link 13 has not been fitted with a fairing attachment as it lies at least partly behind the steering mechanism attachment 17. Clearly an attachment could be fitted to this part of the linkage if the particular landing gear design would substantially benefit from it.

Figure 10:
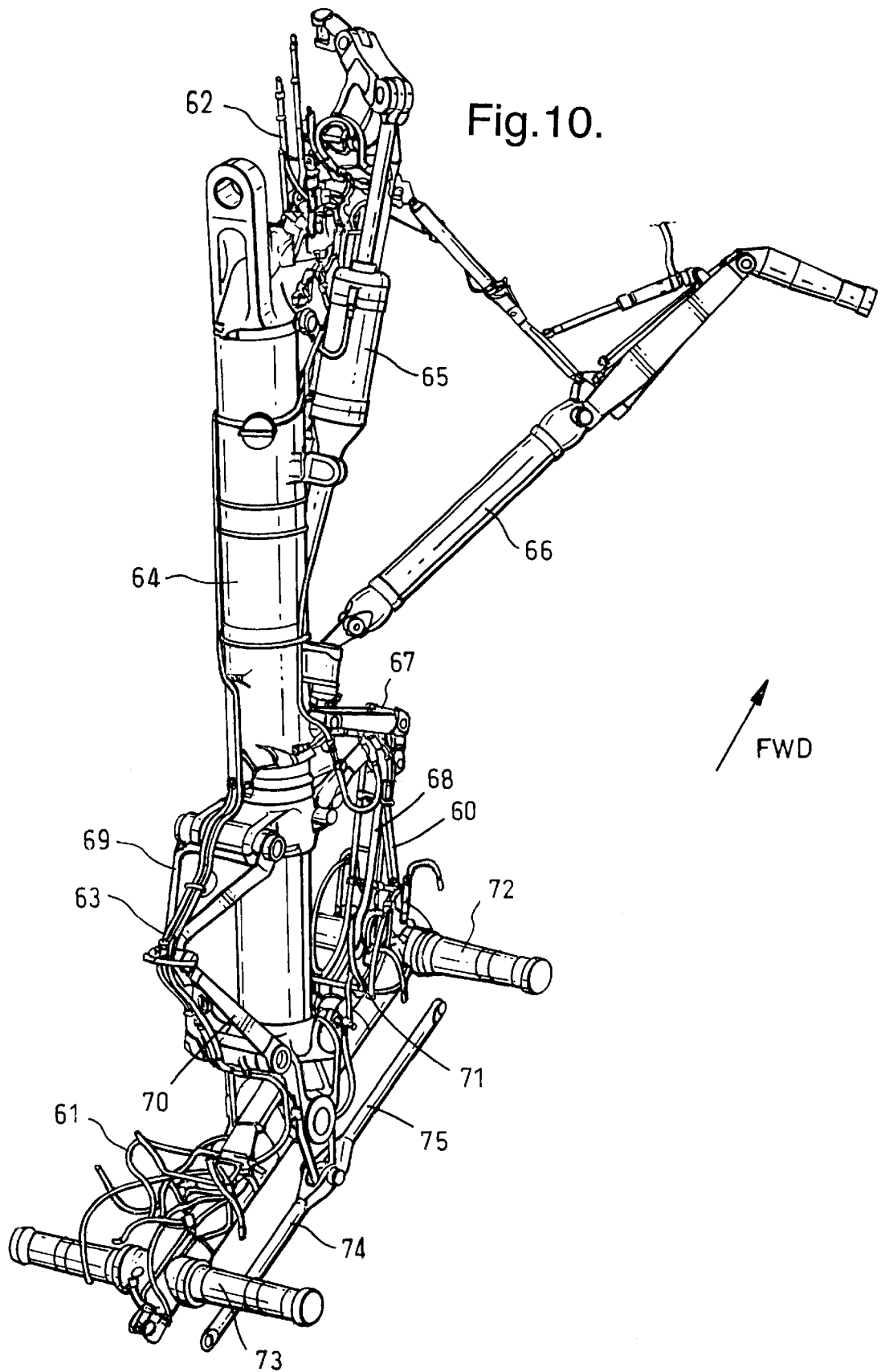
FIG. 10 is an orthogonal view of an aircraft main landing gear with wheels removed to show landing gear dressings.

Referring to FIG. 10, an aircraft main landing gear is shown minus wheels but with its dressings 60, 61, 62, 63 shown. The landing gear comprises a main telescopic leg 64, a retraction actuator 65, a drag stay 66, upper and lower articulation links 67, 68, upper and lower torque links 69, 70, a bogie beam 71, axles 72, 73 and brake rods 74, 75.

Dressings 62 are largely out of the airflow and do not significantly affect noise levels from the landing gear. Dressings 60, 61, 63 are in the airflow when the landing gear is deployed on approach and are sources of noise from the landing gear, especially when combined with other components. It is believed that vortices shed from dressings impact on to other components then to generate noise.

Figure 2:
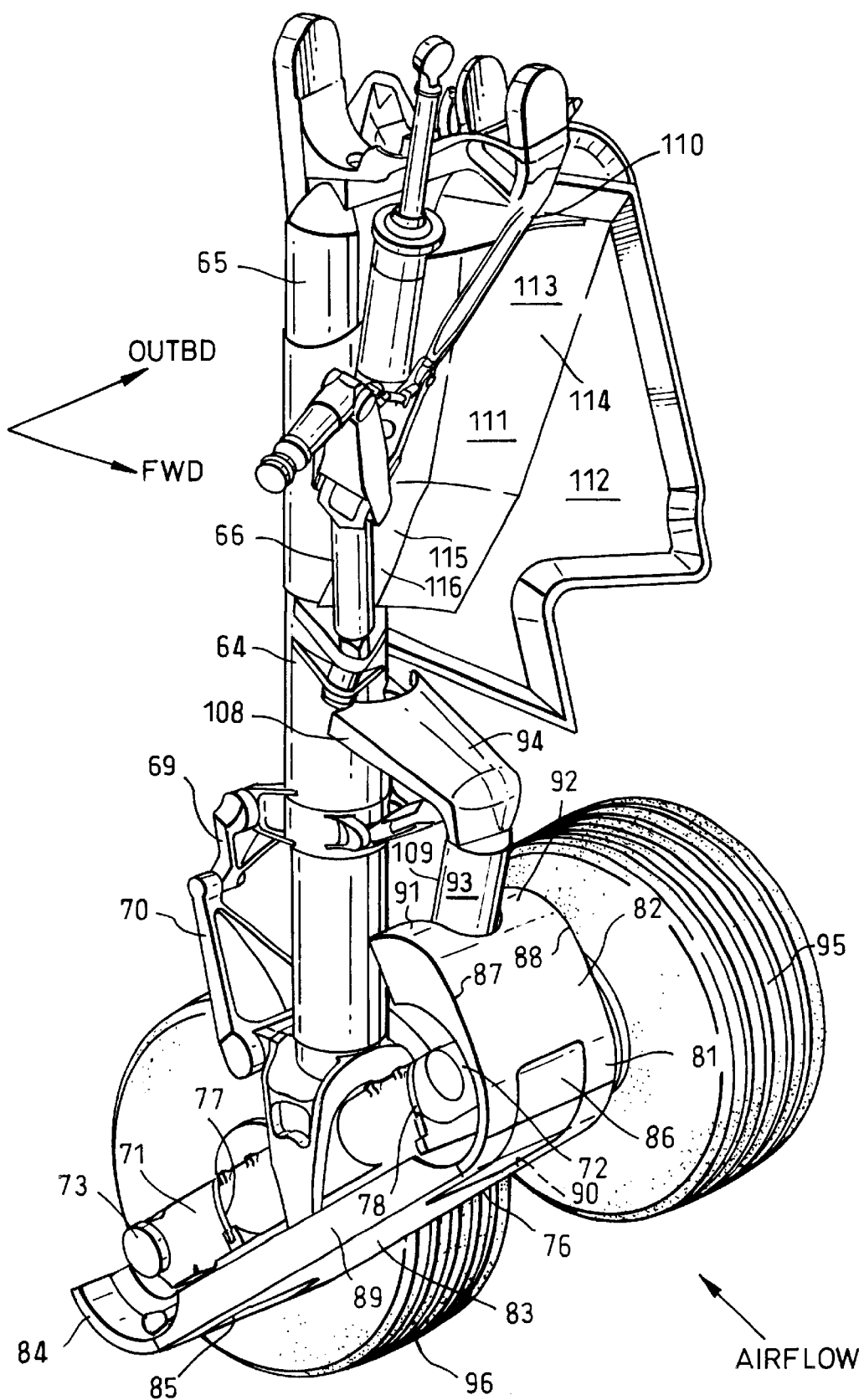
FIG. 2 is an orthogonal cut away view of main landing gear when fitted with apparatus according to the invention.

Referring now to FIGS. 2, 7, 8 and 9, a main landing gear similar to the one shown in FIG. 10 is shown with various noise-reducing fairing attachments fitted, together with details of certain attachments. Referring to FIG. 2, parts common to FIG. 10 have been shown with identical reference numerals. An undertray attachment 76 is shown clamped to the bogie beam 71 by clamps 77, 78 and also by clamps 79, 80 (see FIGS. 8, 9) to the axles 72, 73. The undertray 76 has a single curvature aerodynamic surface 81 extending over a forward upwardly extending portion 82 and a lower portion 83 extending under the bogie beam. A rear curved portion 84 keeps incident air away from the rear axle 73 and its dressings 61 (see FIG. 10). The undertray has a pair of operable access doors 85, 86 for access to jacking points (not shown). Depending from lateral edges 87, 88 of the undertray are a pair of laterally facing surfaces 89, 90 extending longitudinally of the bogie beam on either side of the undertray. The forwardly upwardly extending portion 82 has extensions 91, 92 wrapping around a lower articulation link fairing attachment 93 which works in conjunction with an upper articulation link fairing attachment 94. With the landing gear in the approach position as shown in FIG. 2 it can be seen that the forward portion 82 of the undertray wraps neatly around the lower articulation link fairing attachment 93 to provide a smooth aerodynamic contour of low noise configuration. It will be appreciated that the forward portion 82 of the undertray effectively deflects incident air away from the dressings 60.

The undertray is of a width to permit air to pass between wheels 95, 96 and the undertray for brake cooling. The form of the edges 87, 88 and longitudinally extending surfaces 89, 90 permits air to pass over brake callipers (not shown) between the undertray and the wheels but does not funnel air through these regions at increased speed and therefore create unnecessary noise. The shape of the undertray is generally adapted to deflect air away from noise inducing components on the bogie beam and landing gear generally whilst affording maximum access to the upper and side parts of the bogie beam for inspection and maintenance purposes. Weight saving is also achieved by this configuration, relative to a full enclosure.

Figure 8:
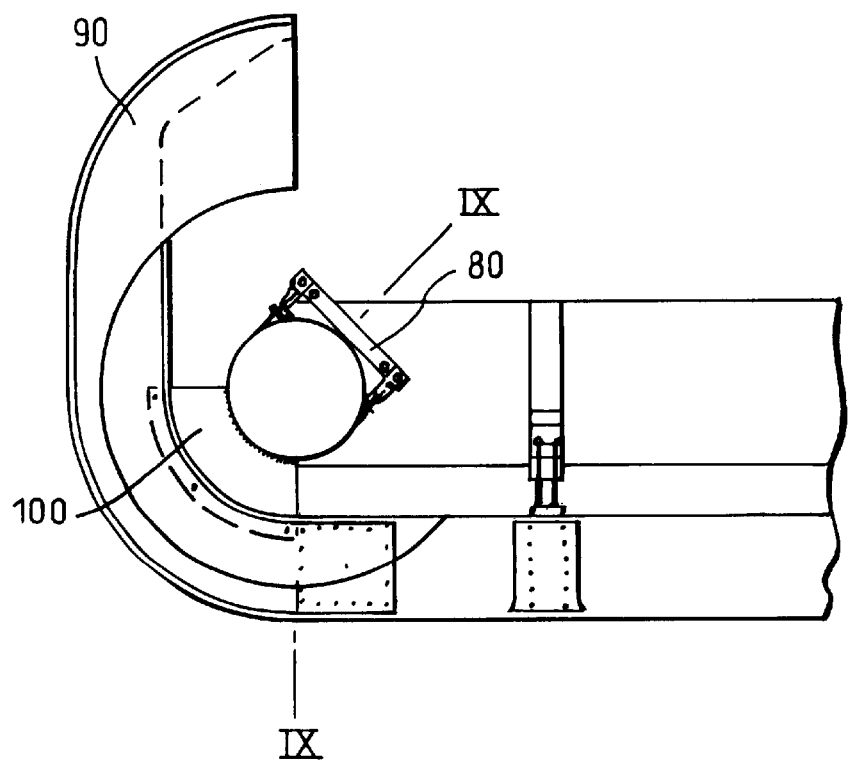
FIG. 8 is a side detail view of a front end of an undertray attachment according to the invention.
Figure 9:
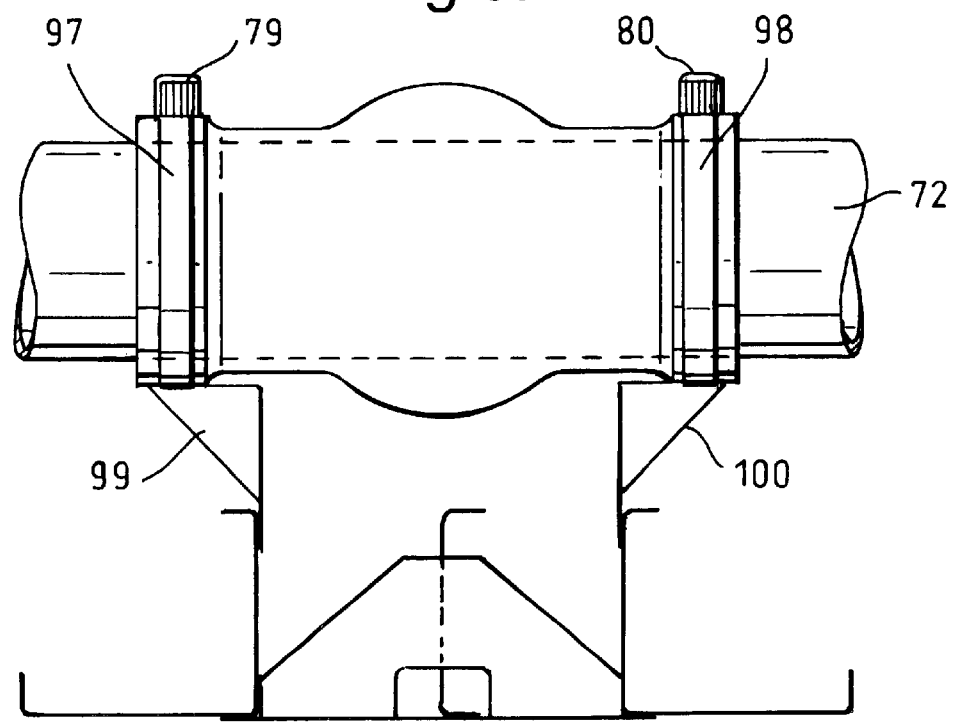
FIG. 9 is a section taken along the line IX—IX of FIG. 8.

The clamps 79, 80 for clamping the undertray to the axles 72, 73 comprise bands 97, 98 passing through part annular elements 99, 100 attached to the undertray (see FIGS. 8 and 9). This method of fitting is extremely rigid, robust and of relatively light weight.

The articulation link fairing 93, 94 is shown in FIG. 2 and also in more detail in FIG. 7. It will be appreciated that the articulation links 67, 68 (see FIG. 10) work in conjunction with telescopic compression of the main leg 64. For this reason the fairing attachments 93, 94 must be able to pivot with respect to each other. Each is separately clamped to its articulation link by clamps 101, 102, 103, 104 (see FIG. 7) but the two interact with each other in region 105 about the pivot centre. It will be seen that upper attachment 94 has a part spherical portion 106 adapted to pass inside a co-operating part cylindrical portion 107 of the lower attachment 93 during pivoting movement of the articulation links. The centre of portions 106 and 107 coincides with the pivot centre of the articulation links. A clearance of 2mm is preferred between portions 106, 107. Edge regions 108, 109 of the attachment are designed to deflect air leaving the attachments 93, 94 away from noise-inducing elements on the main leg 64.

Referring to FIG. 2, forward drag stay 110, retraction actuator 65 and main leg 64 are all shielded from the airstream by a door deflector attachment 111 attached in sealing engagement to a wing skin door 112 attached to the main leg 64. Owing to the way the landing gear is stowed in the bay, space is extremely tight in this area and the deflector attachment 111 achieves the object of deflecting air away from the main leg, the actuator and the forward drag stay without interfering with the stowage of the gear. Air which would otherwise have been accelerated between any combination of the leg, the retraction actuator, the forward drag stay and the door is therefore deflected away from such potential noise-inducing "channels" and around the main leg 64 into the free stream. The attachment 111 is clamped by through bolts to the forward drag stay 110 and comprises a first portion 113 having a generally concave aerodynamic surface 114 and a second portion 115 having a generally convex aerodynamic surface 116.

Once again it will be seen that with relatively minimal use of retro-fittable and easily removable attachments according to the invention that all major noise-inducing areas of the landing gear have been protected from the airflow. At the same time articulation and stowage of the landing gear has not been hindered and additional weight has been kept to a minimum.

What is claimed is:

1. Aircraft noise reduction apparatus including at least one noise-reducing attachment (15,17,76,93,94,111) for landing gear of the aircraft shaped for positioning on the landing gear to deflect air away from noise inducing components of the landing gear and to permit deflection, articulation movement and stowage of the landing gear with the attachment installed, wherein the attachment comprises an axle attachment (15) positionable in front of an axle (3) for nose gear of the aircraft, in which the axle attachment is shaped to enclose a towbar fitting (24).

2. Aircraft noise reduction apparatus including at least one noise-reducing attachment (15,17,76,93,94,111) for landing gear of the aircraft shaped for positioning on the landing gear to deflect air away from noise inducing components of the landing gear and to permit deflection, articulation movement and stowage of the landing gear with the attachment installed, wherein the attachment comprises an axle attachment (15) positionable in front of an axle (3) for a nose gear of the aircraft, said landing gear includes a plurality of wheels in which the axle attachment includes generally cylindrical wheel extensions (30,31) extending between a central portion (32) thereof and each wheel (33).

3. Aircraft noise reduction apparatus including at least one noise-reducing attachment (15,17,76,93,94,111) for landing gear of the aircraft shaped for positioning on the landing gear to deflect air away from noise inducing components of the landing gear and to permit deflection, articulation movement and stowage of the landing gear with the attachment installed, wherein said landing gear includes a strut having an aperture, further including an apertured strut attachment (16) positionable over said aperture (40) in the strut (14) to deflect air away from edges (41,42) of the aperture.

4. Apparatus as in claim 3 in which the attachment (16) is shaped to blend in airflow leaving the attachment with airflow passing over streamwise extending surfaces (45,46) of the strut, when in use.

5. Apparatus as in claim 3 in which the attachment (16) is shaped to deflect air away from noise-inducing elements on the landing gear positioned to the rear of the said strut (14).

6. Aircraft noise reduction apparatus including at least one noise-reducing attachment (15,17,76,93,94,111) for landing gear of the aircraft shaped for positioning on the landing gear to deflect air away from noise inducing components of the landing gear and to permit deflection, articulation movement and stowage of the landing gear with the attachment installed, including an undertray attachment (76) shaped to extend in front of and underneath a bogie beam (71) of the landing gear, in which the undertray (76) includes a forward upwardly extending aerodynamic surface (82) blended smoothly into an undersurface (83) extending underneath and along the bogie beam with a further laterally facing surface extending longitudinally of the bogie beam on either side of the undertray (89,90) depending from lateral edges (87,88) of the undertray.

7. Aircraft noise reduction apparatus including at least one noise-reducing attachment (15,17,76,93,94,111) for landing gear of the aircraft shaped for positioning on the landing gear to deflect air away from noise inducing components of the landing gear and to permit deflection, articulation movement and stowage of the landing gear with the attachment installed, further including an undertray attachment (76) shaped to extend in front of and underneath a bogie beam (71) of the landing gear in which the undertray (76) is attachable to axles (72,73) on the landing gear bogie by means of band-type clamps (79,80) adapted to pass around the axle/bogie beam and through at least one part-annular chamber (99,100) formed in an extension piece fixed to the undertray.

8. Aircraft noise reduction apparatus including at least one noise-reducing attachment (15,17,76,93,94,111) for landing gear of the aircraft shaped for positioning on the landing gear to deflect air away from noise inducing components of the landing gear and to permit deflection, articulation movement and stowage of the landing gear with the attachment installed, further including a pair of articulating fairing attachments (93,94) for attachment to a forward articulation link (67,68) of a bogie of the landing gear, one articulated fairing being mounted to each articulation link with an aerodynamically contoured interface (105) being defined between the fairings comprising a generally spherical element (106) on one fairing (94) co-operating with generally circular section (107) tubing of the other fairing (93).

9. Apparatus as in claim 8 wherein an undertray (76) and the lower articulation link fairing (93) tie closely adjacent one another with the landing gear bogie (71) in an approach-to-landing; configuration.

10. Aircraft noise reduction apparatus including at least one noise-reducing attachment (15,17,76,93,94,111) for landing gear of the aircraft shaped for positioning on the landing gear to deflect air away from noise inducing components of the landing gear and to permit deflection, articulation movement and stowage of the landing gear with the attachment installed, further including a door attachment (111) attachable to a door (112) which is attached to the landing gear, the door extending generally streamwise to one side of the landing gear, the door attachment (111) being positionable to extend from the door in front of at least a main leg (64) of the landing gear.

11. Apparatus as in claim 10 in which the door attachment (111) is adapted for sealing engagement with the door (112).

* * * * *